Nov. 16, 1926.  
B. R. BENJAMIN ET AL  
1,607,230  
CULTIVATOR ATTACHMENT FOR TRACTORS  
Original Filed July 21, 1922   3 Sheets-Sheet 1

Inventors.  
B. R. Benjamin  
C. R. Raney  
and A. E. W. Johnson,  
By

Nov. 16, 1926. 1,607,230
B. R. BENJAMIN ET AL
CULTIVATOR ATTACHMENT FOR TRACTORS
Original Filed July 21, 1922  3 Sheets-Sheet 2
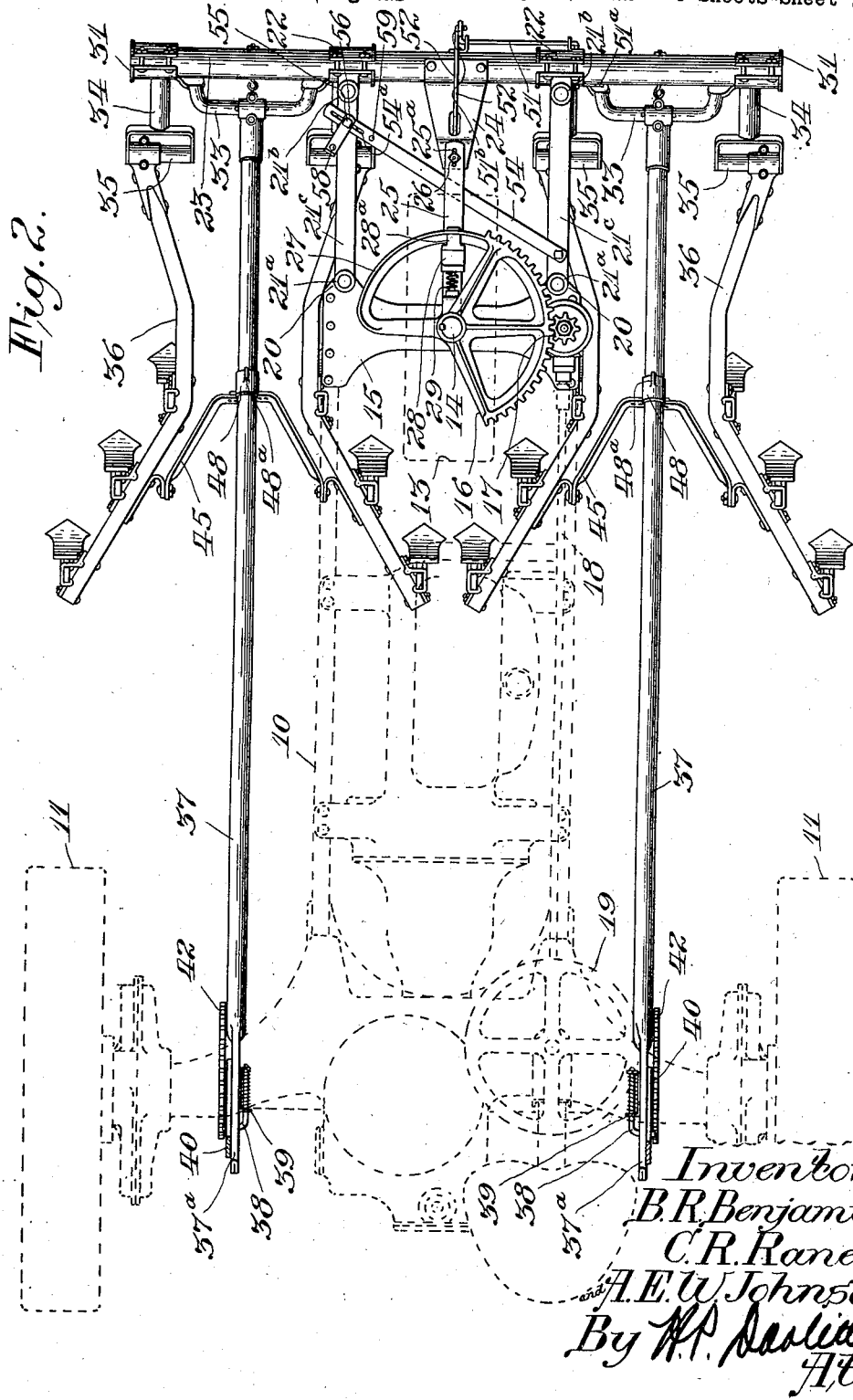

Nov. 16, 1926.
B. R. BENJAMIN ET AL
1,607,230
CULTIVATOR ATTACHMENT FOR TRACTORS
Original Filed July 21, 1922   3 Sheets-Sheet 3
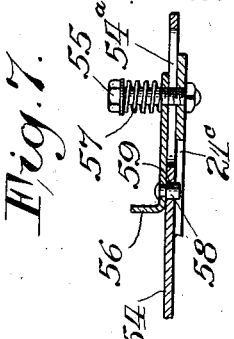
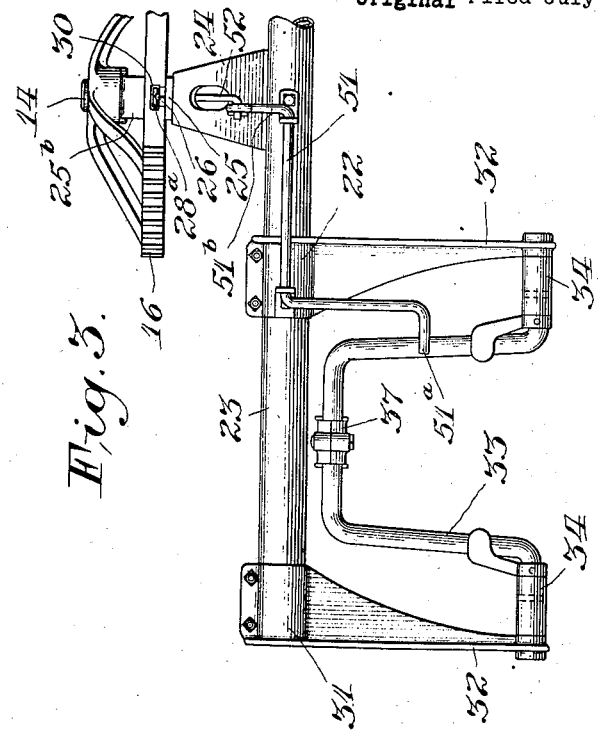
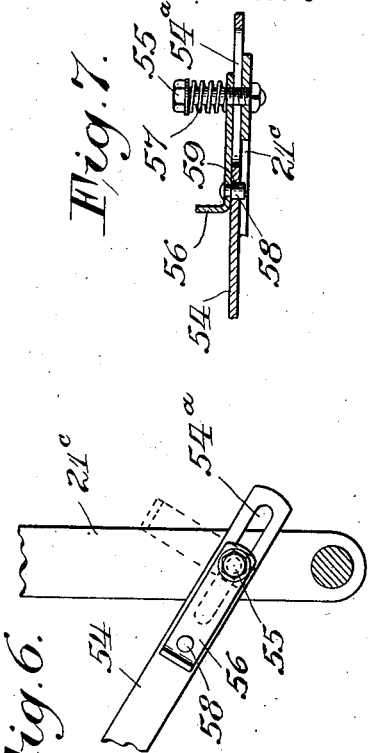
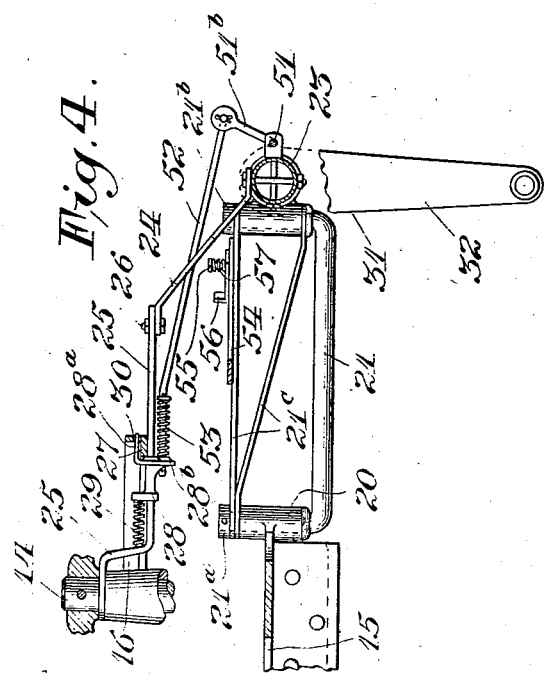
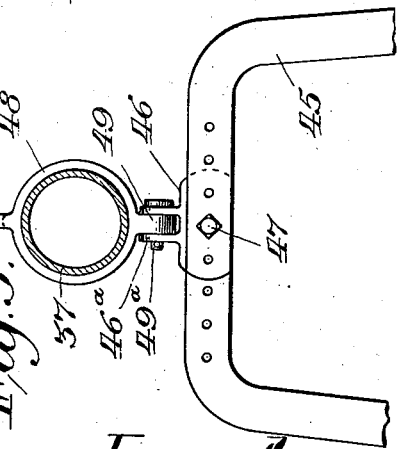
Inventors.
B. R. Benjamin,
C. R. Raney
and A. E. W. Johnson,
By H. P. Doolittle
Atty.

Patented Nov. 16, 1926.

1,607,230

UNITED STATES PATENT OFFICE.

BERT R. BENJAMIN, OF OAK PARK, AND CLEMMA R. RANEY AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY.

CULTIVATOR ATTACHMENT FOR TRACTORS.

Application filed July 21, 1922, Serial No. 576,481. Renewed July 16, 1925.

This invention relates to soil working attachments for tractors and is particularly directed to provision of a cultivator attachment for tractors of the three wheel rigid unitary frame type with one wheel forwardly and centrally disposed and carried on a steering truck.

The principal object of the invention is to combine with that type of tractor, a cultivator attachment to be carried on the front of the tractor in such position that the cultivator beams will be disposed at each side of the steering truck with the shovels to the rear of the axis of the truck wheels and preferably within the outer edges of the paths of treads of the rear traction wheels which should be set far enough apart to permit a pair of cultivator beams to be employed on each side of the steering truck so that two rows of plants may be worked at once, the position of the cultivator attachment at the front of the tractor permitting employment of other implements, coupled to the rear of the tractor, simultaneously with the cultivator.

Another object of the invention is to provide a structure easily attachable and detachable from the tractor and one in which the tool carrying beams and frame support therefor can be shifted laterally and bodily as a unit relative to the unitary tractor frame to follow the deviations in the plant rows and can be lifted or lowered by control means in convenient distance of the operator's seat on the tractor.

A further object is to provide the attachment with a type of lift for the cultivator beams that will permit them to be raised to positions where they will be entirely out of the way so that the attachment can be allowed to remain on the tractor without interfering with its travel or its use for other purposes than cultivating.

It is also an object of the invention to so dispose certain of the cultivating tools that the ground over which the steering wheel has passed will be thoroughly worked.

These principal and other minor objects are accomplished by providing, as a support for the cultivator beams, a comparatively long member extending across the front of the tractor and having attaching means, such as pivoted arms at its center, which are hingedly mounted in sockets at each side of the steering truck. Shifting means connect the supporting member with the truck so that it shares in its steering movement and the cultivator beams are attached to the ends of the member at each side of the truck. The beams are raised and lowered by novel mechanism comprising a control rod extending to the rear of the tractor which rod is so connected to the beams at spaced points in their length as to provide a high and level lift, and means is provided whereby the steering truck becomes connected to the cultivator attachment for lateral shifting action when the beams are lowered and is disconnected when the beams are raised. The invention accordingly resides in the combination, details of construction, and parts, or their equivalents, hereinafter described and particularly defined in the claims.

Referring to the drawings—

Fig. 2 is a plan view similarly drawn;

Fig. 3 is a front detail view of the attachment;

Fig. 4 is a similar side view;

Fig. 5 is a detail of the beam lifting connection; and

Figs. 6 and 7 are details of a latch for the laterally swinging arms of the attachment.

Figure 1:
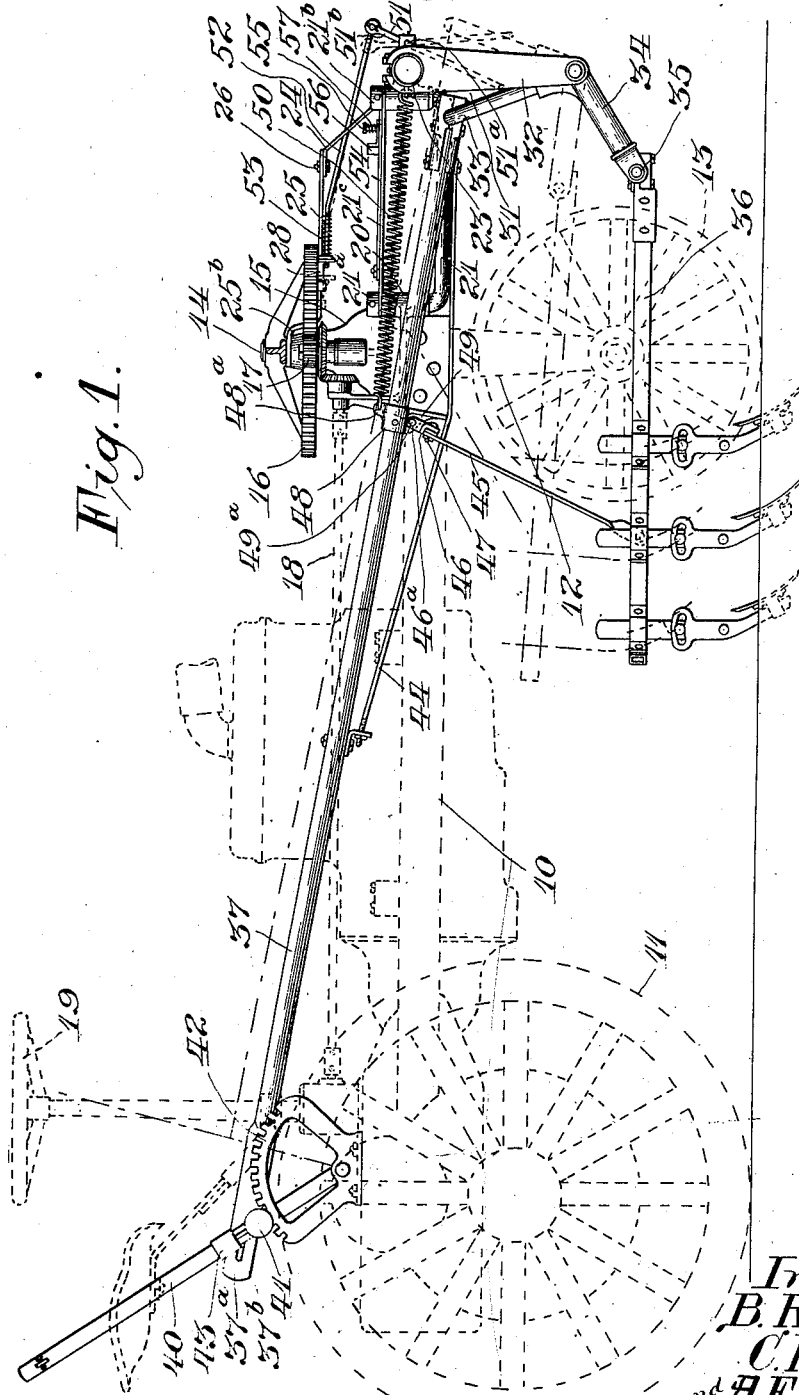
Fig. 1 is a side view of a tractor with the cultivator attachment mounted thereon, the tractor being shown in broken lines and the parts comprising the invention in full lines.

The tractor with which the cultivator attachment is combined as illustrated in broken lines in Figs. 1 and 2, is of the type having a comparatively narrow main frame or body 10 supported on widely spaced rear traction wheels 11 and on a single centrally positioned steering truck 12 supported on the wheel 13 which may be single or double as preferred. The steering truck has a vertical spindle 14 journaled in the front cross member 15 of the tractor frame and the spindle has keyed thereto a horizontally positioned gear sector 16 which meshes with a spur pinion 17 controlled by a steering shaft 18 running back to the steering post and wheel 19 adjacent the operator's seat on the rear of the tractor. In the cross member 15 and on each side of the truck 12 there are provided vertically extending sockets 20 in which are pivoted a pair of forwardly extending pivot arms 21. These arms may be formed with upturned ends as illustrated in the drawings and the inner ends received in the sockets 20 may be retained therein by any suitable means such as the collars 21ª. The outer ends of the arms 21 are journaled in vertical sockets in clamp brackets 22 where they are retained by collars 21ᵇ as at their rear ends. Each of the arms 21 is preferably braced by a pair of members 21ᶜ which engage the upturned rear end of each arm. The lower members diverge forwardly and the members are secured to the upturned forward ends above and below the sockets in clamps 22, as in Fig. 4. The clamp brackets 22 receive the central portion of an elongated, transversely extending frame member 23 which is preferably of the tubular form illustrated. At the middle of the member 23 there is fixedly secured a rearwardly and upwardly inclined plate 24 to which a second rearwardly extending plate or bar 25 is pivotally connected by a bolt 26 which extends through a short slot 25ª therein. At its rear end, the bar 25 is bent upwardly and then backwardly as at 25ᵇ and engages the upper end of the spindle 14 of the truck under the gear sector 16 as shown in Fig. 4. The gear sector 16 is extended in one direction to form an angular flange or track 27 and bar 25 has slidably mounted on it, back of the track 27, a latch member 28 which is spring pressed toward the track by a spring 29 and has a forwardly projecting nose 28ª adapted to engage an opening 30 in the vertical web of track 27, this opening being so positioned that when the nose 28ª is engaged therein, the steering truck and wheel will be in position for straight ahead travel. On the outer ends of the cross member 23, clamp brackets 31 are secured which are counterparts of the brackets 22 all of which are provided with integral depending members 32, thus providing a pair of rigid depending arms at each side of the steering truck which are adjustably clamped to the transverse member 23 and form part of the supporting frame for the cultivator beams. In the lower ends of each pair of depending arms 32 there is journaled the horizontal ends of upwardly arched crank shafts 33 and on these horizontal ends there is secured a pair of rearwardly extending draft elements or brackets 34 in the ends of which are mounted wrist pins 35 to which the front ends of cultivator beams 36 are pivotally connected. Each pair of beams is, therefore, adjacent one side of the centrally positioned truck and extends rearwardly thereof embracing its wheel and placing the cultivating tools back of its axis, and, as the tools, or shovels, on each pair of beams are disposed in divergent ranks, the shovels on the inner beams will be on lines converging back of the truck with the rear shovels located in the tread of its wheel or wheels.

To the central part of the upwardly arched or cranked portion of the shafts 33 there is pivoted the forward ends of operating rods 37 which extend rearwardly and are flattened at their rear ends as at 37ª. These flattened ends are slotted as at 37ᵇ to receive the outwardly bent end of a spring pressed pawl or latch 38 which is slidably mounted in a lug 39 on the inner side of the flattened portion of rods 37. After passing through the slot 37ᵇ, the end of latch 38 engages in an operating lever 40 pivoted on a sector bracket 42 mounted on the rear axle housing of the tractor which has a pinion 41 mounted on it in position to engage the sector 42 in the usual manner, the pinion 41 being locked in adjusted position by the ordinary spring pressed latch 43 on the lever. The construction just described provides for accurate adjustment of the depth of cultivation and also gives a yielding connection between the operating lever and the rod so that yielding pressure can be applied to the cultivator beams. Owing to the length of the operating rods 37, they are preferably braced on their under sides by the truss members 44 as shown in Fig. 1. Each pair of the cultivator beams 36 is connected near its rear ends by a spreader arch 45 which may be made in two sections adjustably connected to each other and to a supporting bracket 46 by a bolt 47 as shown in Fig. 5. At a point intermediate its ends, each rod 37 has secured to it a collar 48 which has a depending lug 49 which is received between upstanding ears 46ª on the bracket 46, the two being connected by a bolt or pin 49ª. Each collar 48 is also provided at its top with an eye 48ª which serves to receive the rear end of tension spring 50, the other end of which is secured to an eye on the member 23 the function of which is to assist in lifting the beams. It will be evident from the construction described that as the operating rod 37 is moved back and forth by the lever 40 the crank shaft 33 will be swung and the rearwardly extending brackets 34, which are at right angles to the crank or arch of axles 33, will move upwardly and downwardly thereby raising and lowering the front ends of the pair of cultivator beams attached thereto. At the same time the spreader arch supporting the rear ends of the beams will move forward and backward with the operating rod by reason of its connection thereto and the rear ends of the beams will be raised and lowered in unison with the front, thus giving a substantially level movement to the beams as indicated in dotted lines on Fig. 1. For the purpose of controlling the latch 28 as the beams are raised and lowered, there is provided a double crank shaft 51 journaled on the forward face of the member 23, which shaft has one crank extending downwardly and then outwardly as at 51ᵃ in position to be engaged by the crank of one of the shafts 33 as it swings outwardly. The opposite crank of shaft 51 extends upwardly as at 51ᵇ and is formed with an eye at its end in which is pivoted the outer end of a latch operating rod 52 which has its rear end slidably attached to a depending lug 28ᵇ on latch 28. A spring 53 carried on this rod between the lug 28ᵇ and a stop on the rod serves to keep the shaft 51 swung into position for engagement by shaft 33 but the thrust of spring 53 is sufficient to move latch 28 against pressure of spring 29 when the rod 52 moves backwardly. As means for limiting the lateral swinging movement of the pivoted arms 21, there is provided a bar 54, (Fig. 2) which is connected to the upper brace bar 21ᶜ in proximity to the inner pivot of one member 21 and extends diagonally outward to near the outer pivot of the other member where it engages a pin or bolt 55 on the opposite brace member 21ᶜ. The bolt 55 works in a slot 54ᵃ in bar 54 and a latch member 56 is pivoted on bolt 55 and is held down by a spring 57, (Fig. 7) which bears downwardly on the latch member 56 and keeps it in contact with bar 54. Near its outer end, latch 56 is provided with a locking pin 58 on its under side which is adapted to engage a perforation or opening 59 in bar 54. With this arrangement, the lateral swing of the members 21, and therefore of the cultivator attachment as a whole is limited by the length of slot 54ᵃ and, when it is desired to lock the cultivator attachment against any lateral movement, as when the beams are raised and the cultivator is not being used, the latch 56 can be swung into position parallel with the bar 54 when the pin 58 will engage opening 59 and lock the parts in position. On the other hand, when the latch 56 is swung around as in Fig. 2, the cultivator attachment will be free to swing laterally to a degree limited by the length of slot 54ᵃ which likewise limits the steering movement of the truck when the cultivator is in operation, the range of movement allowed being ample for following the rows.

With the construction and arrangement above described, it will be evident that a cultivator attachment is provided which, when in position, provides a two-row tractor cultivator characterized by the fact that the front wheel is embraced by or positioned between the two pairs of cultivator beams so that a row of plants is straddled by the beams on each side of the steering truck or wheel, and the further fact that the rear wheels are in the spaces outside the two rows being cultivated so that the plants will pass under the rear axle, and also by the fact that the inner beam of each pair is so positioned with respect to the front wheel that certain of the cultivating tools will work adjacent the sides and in the path of the wheel so that the ground over which the front wheel has passed is thoroughly cultivated and no packed wheel track is left. A further characteristic of the construction is that when the cultivator beams are in lowered position, the latch 28 will be in engagement with the opening in the web of track 27 and consequently the bar 25 will be swung laterally when the truck is steered to the right or left and, through the pivotal connection of bar 25 with the plate 24 on member 23, the cultivator attachment as a whole will share in the lateral movement of the steering truck to an extent limited by the length of slot 54ᵃ as before stated. When the beams are raised, the swinging of crank shaft 51 will push latch 28 backwardly and the steering truck will then be free to be turned to any desired extent for directing the travel of the tractor.

There has accordingly been provided a cultivator attachment which is simple in construction and adapted for attachment to any tractor of the type above referred to and one which will be easy to guide during operation and which is so positioned with relation to the driver's seat that the operator on the tractor can at all times see the rows being cultivated and can easily guide the machine as necessary to follow deviations in the rows. The absence of front carrying wheels located at the outer sides of the beams and close to the adjacent plant rows, as common in the prior art, allows greater range of lateral movement in guiding the cultivator for the reason that the central wheel is midway between two rows while wheels on the outer sides must ordinarily travel close to the next outside rows with consequent risk of running over them while guiding. Moreover, with the outer wheels and the supporting structure for them absent, the driver's view of adjacent plant rows is unobstructed, and accurate guiding of the machine is thereby greatly facilitated.

While a preferred form of the invention is here described by way of example, it is understood that changes are possible in the details of construction within the scope of the following claims.

We claim—

1. The combination with a vehicle having a centrally positioned front truck, of cultivating means comprising a transversely extending support positioned in advance of the truck and connected to the vehicle by means permitting the support to be shifted laterally, tool beams attached to the support at each side of the truck and reaching to the rear of the truck, and cultivating tools on the ends of the beams.

2. The combination with a vehicle having a centrally positioned front steering truck and means for steering the truck, of cultivating means comprising a transversely extending support connected to the vehicle in advance of the truck by means permitting the support to be shifted laterally, tool beams attached to the support at each side of the truck and reaching to the rear of the truck, cultivating tools on the ends of the beams, and means connecting the transverse support and truck for shifting it laterally by steering movement of the truck.

3. The combination with a vehicle having a centrally positioned front steering truck and means for steering the truck, of a forwardly projecting, laterally swinging extension on the front of the vehicle, a transversely extending support carried by said extension, tool beams attached to said support at each side of said truck, and means cooperating with the steering means for swinging said extension laterally.

4. The combination with a vehicle having a narrow longitudinally extending frame supported at one end on a centrally positioned wheel, of a transversely extending supporting member carried on said frame in advance of the wheel and projecting beyond the frame on both sides, a pair of cultivator beams on each end of the supporting member extending rearwardly and embracing the supporting wheel, and cultivating tools on the ends of the beams.

5. The combination with a vehicle having a centrally positioned front steering truck and means for steering the truck, of a forwardly projecting, laterally swinging extension on the front of the vehicle, means for limiting the movement of said extension, a transversely extending support carried by said extension, tool beams pivoted on said support at each side of the truck, means for raising and lowering the tool beams, means cooperating with the steering means for swinging said extension laterally including a releasable connection, and means for automatically releasing said connection as the tool beams are raised.

6. The combination with a vehicle having a centrally positioned front steering truck and means for steering the truck, of parallel forwardly extending pivoted arms on the front of the vehicle, a transversely extending support to which said arms are pivoted at their forward ends, tool beams attached to the support at each side of the truck, and a releasable connection between the truck and transverse support for causing the support to shift laterally when the truck is steered.

7. The combination with a vehicle having a central front wheel, of cultivating means comprising tool beams positioned on each side of said wheel with their forward ends attached to the vehicle in advance of said wheel with their free ends to the rear thereof, one beam on each side having its tools arranged to cultivate the ground directly behind said wheel.

8. The combination with a tractor having three supporting wheels one of which is positioned ahead of and midway between the other two, of a support carried by the tractor in advance of said midwheel, cultivating means comprising pairs of tool beams positioned on the opposite sides of said midwheel and inside the tread of the other wheels with their forward ends attached to said support, each pair positioned to straddle a row of plants.

9. The combination with a vehicle having two main supporting wheels, a steering truck positioned ahead of and midway between them and means for steering said truck, of a support carried by the tractor in advance of said truck, cultivating means comprising pairs of tool beams positioned on the opposite sides of the truck and inside the tread of the main wheels, with their forward ends connected to said support, each pair of beams being positioned to straddle a row of plants and means connecting said transverse support to the steering means for shifting it laterally by steering movement of said truck.

10. A cultivator attachment for tractors having a central steering wheel comprising an elongated frame member, means on the member for connecting it across the front of a tractor, and a pair of cultivator beams attached to each end of said member in position to drag at each side of the tractor and embrace said steering wheel when the attachment is mounted thereon.

11. A cultivator attachment for tractors having a central steering wheel, comprising an elongated frame member, laterally projecting pivot arms thereon adapted to be connected to the front of a tractor to position said member across the front thereof, means on said member adapted to cooperate with actuating means on the tractor for shifting said member laterally on its pivot arms, and a pair of cultivator beams attached to each end of said member in position to drag at each side of the tractor and embrace said steering wheel when the attachment is mounted thereon.

12. In a cultivator, the combination of a supporting member having a pair of depending arms, an upwardly arched crank shaft having horizontal portions journaled in said arms, rearwardly projecting members on the horizontal portions of said shaft, cultivator beams pivoted to the ends of said members, and a rearwardly extending operating rod pivoted at its forward end to the crank of said shaft and having an intermediate connection with each of said cultivator beams.

13. In a cultivator, the combination of a supporting member having a depending arm, a crank pivoted on said arm and having a rearwardly extending member fixed thereon, a cultivator beam pivoted on the end of said member, a rearwardly extending operating rod pivoted to said crank, a link connecting the cultivator beam to an intermediate portion of said rod, and adjusting mechanism connected to the operating rod for shifting it longitudinally.

14. The combination with a tractor including a front steering wheel, of supporting elements projecting from the tractor ahead of the steering wheel, a cultivator attachment comprising a pair of cultivator beams positioned at each side of the steering wheel with their forward ends connected to said supporting elements, certain of the tools on said beams being located at the sides of and behind said wheel.

15. The combination with a tractor including a front steering wheel, of a cultivator attachment comprising a transversely extending supporting member connected to the tractor by members extending in advance of the tractor and movable laterally with respect thereto, an upright arch supported beneath each end of said member, and a pair of cultivator beams connected to the branches of each arch in position to straddle a row of plants at each side of the steering wheel.

16. The combination with a tractor including a front steering wheel, of supporting elements projecting from the tractor ahead of the steering wheel, a cultivator attachment comprising a pair of cultivator beams positioned at each side of the steering wheel with their forward ends connected to said supporting elements, and cultivating tools on said beams located at points behind the axis of said wheel.

17. The combination with a tractor having a forward steering wheel, of a bearing member on the tractor frame at each side of said wheel, forwardly extending arms having vertical bearing portions journaled in said bearing members, an implement supporting frame extending across the front of the tractor to which said arms are pivotally connected on vertical axes, and means on the tractor for shifting said frame laterally.

18. In a tractor having a frame carried on widely spaced rear traction wheels and a centrally disposed steering truck at the front end, the combination of a supporting member extending laterally across the front end of the tractor frame, earth working tools carried by said supporting member, said tools being arranged on opposite sides of the steering truck, and means for steering the truck, said supporting member and earth working tools being bodily and laterally shiftable as a unit relatively to the tractor frame and differentially with respect to the steering truck.

19. In a tractor having a frame carried on traction wheels and a steering truck, the combination of a transversely extending supporting member shiftably mounted on the tractor frame for movement laterally and projecting laterally beyond the truck, earth working tools carried by said supporting member, means for steering the steering truck of the tractor, and means connected with the steering truck for bodily shifting the supporting member and earth working tools as a unit relatively to said tractor frame and differentially with respect to the truck.

20. The combination with a vehicle having a central steerable front wheel, of laterally shiftable cultivating devices embracing said wheel and carried by the vehicle, and manually controlled means on the vehicle for both steering the front wheel and shifting the cultivating devices relatively to the frame and differentially with respect to the steerable wheel.

21. The combination with a unitary tractor including a central front wheel and widely spaced rear traction wheels and a frame connecting and supported by said wheels, of earth working tools hung from the tractor frame at its front end, said tools being disposed on opposite sides of the central front wheel, and means for bodily and laterally shifting said tools as a unit with respect to the tractor frame and differentially with respect to the central wheel.

22. In a tractor having a frame carried on traction wheels and a steering truck, the combination of a transversely extending supporting member carried on the forward portion of the tractor frame and projecting laterally of the truck, earth working tools carried by said supporting member, and a common control means comprising a hand wheel for angling the truck to steer the tractor and bodily therewith shift the supporting member and earth working tools in the same direction as a unit relatively to the tractor frame and differentially with respect to the truck.

23. The combination with a tractor having a narrow longitudinally extending body with lateral axle extensions at the rear supported on widely spaced traction wheels, a narrow tread steering truck at the forward end of the body and a control station on the rear portion of the tractor, of cultivating implements located on each side of the longitudinal body of the tractor having earth working tools positioned to engage the ground in advance of the traction wheels and back of the forward end of said body, certain of said tools being located on transverse lines passing through the steering truck, supporting means for said implements carried by the forward part of said body and extending laterally beyond each side of the truck, the cultivating implements trailing from said lateral extensions, and means for controlling operation of the cultivating implements operable from the control station of the tractor.

24. The combination with a tractor, of bearing brackets secured thereto at its front, an implement supporting member extending across the front of the tractor and shiftably supported by said brackets, said member projecting laterally from each side of the tractor and carrying cultivating implements on its projecting ends, and means for shifting said member on said brackets in the direction of its length.

25. The combination with a tractor, of bearing brackets secured thereto at its front, forwardly projecting arms connected to said brackets on vertical pivots, an implement supporting frame extending across the front of the tractor to which the outer ends of said arms are pivoted on vertical axes, and means for shifting said frame and arms laterally during travel of the tractor.

26. A cultivator attachment for tractors comprising an elongated tubular member, means for connecting said member across the front of a tractor and spaced in advance thereof, a pair of cultivator beams pivotally carried by each end of said member, and lifting and lowering means therefor including vertically swinging crank arms also mounted on said member and connected to the beams, said lifting and lowering means having actuating means including an element adapted to extend to the driver's station on the tractor.

27. The combination with a tractor, of a cultivator attachment comprising supporting means projecting in advance of the tractor, a transversely extending member carried on the forward end of said supporting means and projecting laterally beyond each side of the tractor, vertically shiftable tool carrying beams supported on each end of said member in position to work a plant row at each side of the longitudinal median line of the tractor, and means for lifting and lowering the beams including crank arms pivotally supported on said transverse member and having free ends connected to said tool beams, and actuating means for swinging said crank arms vertically.

28. The combination with a tractor, of a cultivator attachment comprising supporting means projecting in advance of the tractor, a transversely extending member carried on the forward end of said supporting means and projecting laterally beyond each side of the tractor, vertically shiftable tool carrying beams supported on each end of said member in position to work a plant row at each side of the longitudinal median line of the tractor, and means for lifting and lowering the beams including bearing arms secured to the transverse member and extending therefrom, crank arms pivotally supported between the ends of said bearing arms and having free ends connected to the tool beams and means for swinging the crank arms on said bearing arms.

29. The combination with a tractor, of a cultivator attachment comprising supporting means projecting in advance of the tractor, a transversely extending tubular supporting member carried on the forward end of said supporting means and projecting laterally beyond each side of the tractor, a pair of spaced bearing arms clamped on each end of said tubular member and extending therefrom, a pair of crank-arms mounted between each pair of bearing arms, tool carrying beams connected to the crank-arms and lift actuating means connected to the crank-arms and beams.

30. A cultivator attachment for tractors comprising a frame member, means for detachably securing said frame member across the forward end of a tractor, shovel supporting beams connected to said member, a rearwardly extending member carried by each end of said frame member, and attaching means on the rear ends of said rearwardly extending members adapted to be mounted on the rear axle structure of a tractor.

31. The combination with a tractor having two main supporting wheels, a steering truck positioned ahead of and between said wheels and means for turning the truck, of a cultivator attachment comprising pairs of tool beams positioned on opposite sides of the truck and inside the tread of the main wheels with their forward ends connected to a transversely extending frame member carried by the tractor in advance of the turning axis of the truck, and a rearwardly extending frame member carried by each end of said transverse frame member and mounted on the rear axle structure of the tractor.

32. The combination with a tractor having a narrow longitudinally extending body with lateral extensions at the rear supported on widely spaced traction wheels, a narrow tread steering truck, and means for steering the truck wheels, of cultivator beams positioned at each side of the steering truck with forward ends connected to supporting elements projecting laterally at each side of the tractor in advance of the steering truck, cultivating tools on said beams located ahead of the traction wheels and to the rear of the truck wheels, and additional earth working tools positioned to engage the soil in the track of the truck wheels.

33. A cultivator attachment for tractors having a longitudinally extending body with front and rear supporting means, said attachment comprising a long frame member provided with means for mounting it across the front end of the tractor body forward of the front supporting means with its ends projecting laterally beyond each side of the tractor body and of the front supporting means, a pair of trailing cultivator beams connected to each end of said frame member and adapted to drag at each side of the tractor body and front supporting means, said beams being constructed to extend to points back of the front supporting means but forward of the rear supporting means when the attachment is on the tractor, and means included in the attachment for permitting the cultivator beams to be shifted laterally with respect to the tractor and front supporting means during travel of the tractor.

In testimony whereof we affix our signatures.

BERT R. BENJAMIN.
CLEMMA R. RANEY.
ARNOLD E. W. JOHNSON.